United States Patent Office 3,330,640
Patented July 11, 1967

3,330,640
METHOD FOR THE CONTROL OF
UNDESIRABLE VEGETATION
Raymond W. Luckenbaugh, Wilmington, Del., assignor to E. I. du Pont de Nemours and Company, Wilmington, Del., a corporation of Delaware
No Drawing. Filed May 27, 1964, Ser. No. 370,662
7 Claims. (Cl. 71—92)

This application is a continuation-in-part of application Ser. No. 78,341, filed Dec. 27, 1960, now abandoned.

This invention relates to novel uracil compounds. It is more particularly directed to novel uracil addition compounds and to methods and compositions for using them as herbicides.

The novel addition compounds of this invention are those having the formula (1)

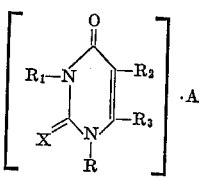

In this formula $R_1$ is alkyl of 1 through 10 carbon atoms, substituted alkyl of 1 through 8 carbon atoms, aryl of 5 through 10 carbon atoms, substituted phenyl, aralkyl of 5 through 13 carbon atoms, substituted aralkyl of 5 through 13 carbon atoms, alkenyl of 3 through 8 carbon atoms, alkynyl of 3 through 8 carbon atoms, cycloalkyl of 3 through 12 carbon atoms, cycloalkenyl of 4 through 12 carbon atoms, cycloalkyl alkyl of 4 through 13 carbon atoms, cycloalkenyl alkyl of 5 through 13 carbon atoms, (substituted cycloalkyl)alkyl of 5 through 14 carbon atoms, and (substituted cycloalkenyl)alkyl of 5 through 14 carbon atoms, or cyano;

$R_2$ is hydrogen, halogen, alkyl of 1 through 4 carbon atoms, alkoxy of 1 through 4 carbon atoms, nitro, alkoxymethyl of 2 through 6 carbon atoms, hydroxy alkyl of 1 through 6 carbon atoms, alkenyl of 3 through 6 carbon atoms, thiocyanato, cyano, thiolmethyl, alkylthio of 1 through 4 carbon atoms, bromomethyl, methylthiomethyl, fluoromethyl, chloromethyl, phenylthiomethyl or carboxymethylthiomethyl;

$R_3$ is hydrogen, chloro, bromo, alkyl of 1 through 5 carbon atoms, chloroalkyl of 1 through 4 carbon atoms, bromoalkyl or 1 through 4 carbon atoms or alkoxy of 1 through 5 carbon atoms;

$R_4$ is hydrogen, alkyl of 1 through 5 carbon atoms, substituted alkyl of 1 through 5 carbon atoms, alkenyl of 2 through 5 carbon atoms, or alkynyl of 3 through 5 carbon atoms;

X is oxygen or sulfur; and

A is an acid having an ionization constant greater than $2 \times 10^{-5}$.

with the proviso that $R_2$ and $R_3$ can form a divalent alkylene bridge of the formula $(CH_2)_n$ where $n$ is 3, 4 or 5.

For $R_1$ the term "substituted alkyl" is intended to include such radicals as bromoalkyl of 1 through 8 carbon atoms,
chloroalkyl of 1 through 8 carbon atoms,
hydroxyalkyl of 1 through 8 carbon atoms,
alkoxyalkyl of 2 through 8 carbon atoms,
alkoxy carbonyl alkyl of 3 through 8 carbon atoms,
and cyanoalkyl of 2 through 8 carbon atoms.

Similarly, the terms "aryl" and "substituted phenyl" embrace radicals such as phenyl,
naphthyl,
o-biphenyl,
pyridyl,
chlorophenyl,
bromophenyl,
alkoxyphenyl,
dibromophenyl,
fluorophenyl,
trichlorophenyl,
alkylphenyl of 7 through 11 carbon atoms,
dialkylphenyl of 8 through 12 carbon atoms,
chloroalkylphenyl of 7 through 10 carbon atoms,
nitrochlorophenyl,
nitrophenyl,
dichloronitrophenyl,
chloroalkoxyphenyl of 7 through 11 carbon atoms,
trifluoromethylphenyl,
tetrahydronaphthyl, and
indenyl.

The terms "aralkyl" and "substituted aralkyl" are intended to include such radicals as furfuryl,
benzyl,
phenylalkyl of 8 through 11 carbon atoms (total),
chlorobenzyl,
dichlorobenzyl,
alkylbenzyl of 8 through 11 carbon atoms (total),
dialkylbenzyl of 9 through 13 carbon atoms (total),
nitrobenzyl,
alkoxybenzyl of 8 through 11 carbon atoms (total),
and naphthylmethyl.

The terms "cycloalkyl," "cycloalkenyl," "cycloalkyl alkyl," and "cycloalkenyl alkyl" will include cyclohexyl,
cyclohexenyl,
cyclohexylalkyl,
cyclohexenylalkyl,
cyclopentyl,
cyclopentenyl,
cyclopentylalkyl,
cyclopentenylalkyl,
norbornyl,
norbornenyl,
norbornylalkyl,
norbornenylalkyl,
bicyclo (2,2,2) octyl,
bicyclo (2,2,2) octenyl,
bicyclo (2,2,2) octylalkyl,
bicyclo (2,2,2) octenylalkyl,
cyclopropyl,
cyclobutyl,
cyclobutylalkyl,
cyclobutenyl,
cyclobutenylalkyl,
hexahydroindanyl,
tetrahydroindanyl,
hexahydroindenyl,
hexahydroindenyl alkyl,
tetrahydroindanyl alkyl,
hexahydroindanyl alkyl,
hexahydro-4,7-methanoindenyl,
tetrahydro-4,7-methanoindanyl,
hexahydro-4,7-methanoindanyl,
hexahydro-4,7-methanoindanyl alkyl,
tetrahydro-4,7-methanoindanyl alkyl,
hexahydro-4,7-methanoindanyl alkyl,
decahydronaphthyl, decahydronaphthyl alkyl,
tetrahydronaphthyl,
tetrahydronaphthyl alkyl,
decahydro-1,4-methanonaphthyl,
decahydro-1,4-methanonaphthyl alkyl,
octahydro-1,4-methanonaphthyl,
octahydro-1,4-methanonaphthyl alkyl,
decahydro-1,4-5,8-dimethanonaphthyl,
decahydro-1,4-5,8-dimethanonaphthyl alkyl,
octahydro-1,4-5,8-dimethanonaphthyl, and
octahydro-1,4-5,8-dimethanonaphthyl alkyl.

These cyclic substituents can be further substituted with alkyl groups of 1 through 4 carbon atoms, methoxy, chlorine and bromine.

For $R_4$ the term "substituted alkyl" is intended to include bromo alkyl 1–5 carbon atoms
chloro alkyl 1–5 carbon atoms
hydroxy alkyl 1–5 carbon atoms
alkoxy alkyl 2–5 carbon atoms
carboxy alkyl 2–5 carbon atoms
alkoxy carbonyl alkyl of 3–6 carbon atoms
alkyl of 1–5 carbon atoms
cyano alkyl 2–5 carbon atoms Preferred for use according to this invention because they are effective as herbicides at lower rates of application are compounds of Formula 1 where $R_1$ is alkyl of 1 through 10 carbon atoms, cycloalkyl of 5 through 13 carbon atoms, cycloalkenyl of 5 through 13 carbon atoms, cycloalkyl alkyl of 4 through 14 carbon atoms, cycloalkenyl alkyl of 5 through 12 carbon atoms or phenyl;

$R_2$ is hydrogen, halogen, alkyl or 1 through 4 carbon atoms or substituted alkyl of 1 through 4 carbon atoms;

$R_3$ and $R_4$ are hydrogen or alkyl of 1 through 4 carbon atoms; and

X is oxygen.

Any acid having an ionization constant greater than $2 \times 10^{-5}$ will form a uracil addition compound defined by Formula 1. Preferred acids are halogenated aliphatic acids containing from 2 to 5 carbon atoms, halogenated benzoic acids, halogenated phenylacetic acids, halogenated phenoxy acetic acids, organic sulfonic acids, organic phosphoric acids, and inorganic phosphoric acids. These acids are preferred because the uracil addition compounds formed from them are highly phytotoxic and show good oil solubility. Illustrative of these acids are:

2,3,5-trichlorobenzoic acid
2,3,6-trichlorobenzoic acid
2,3,5,6-tetrachlorobenzoic acid
2,3,5-triiodobenzoic acid
2-methoxy-3,6-dichlorobenzoic acid
2-methoxy-3,5,6-trichlorobenzoic acid
2-methyl-3,6-dichlorobenzoic acid
2,5-dichloro-3-aminobenzoic acid
2,5-dichloro-3-nitrobenzoic acid
2,3,6-trichlorophenylacetic acid
2,3,5,6-tetrachlorophenylacetic acid
2-methoxy-3,6-dichlorophenylacetic acid
2,4-dichlorophenoxyacetic acid
2,4,5-trichlorophenoxyacetic acid
phosphoric acid
methane phosphoric acid
phenylphosphoric acid Most preferred because of the grass-killing power and ease of preparation of their addition compounds are acids of the formula

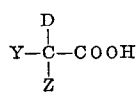

wherein D is halogen; Y is hydrogen, halogen, alkyl of from 1 to 3 carbon atoms, or haloalkyl; and Z is hydrogen, halogen or alkyl. Illustrative of these acids are:

chloroacetic acid
dichloroacetic acid
trichloroacetic acid
bromoacetic acid
dibromoacetic acid
tribromoacetic acid
trifluoroacetic acid
$\alpha,\alpha$-dichloropropionic acid
$\alpha,\alpha$-dibromopropionic acid
$\alpha,\alpha,\beta$-trichloropropionic acid
$\alpha,\alpha,\beta$-trifluoropropionic acid
$\alpha,\alpha$-dichlorobutyric acid
$\alpha,\beta$-dichloroisobutyric acid
$\alpha,\beta,\beta$-trichloroisobutyric acid
$\alpha,\alpha$-dichlorovaleric acid Also preferred because of the high herbicidal activity of their uracil addition compounds as foliage sprays are acids of the formula $R_5SO_3H$, where $R_5$ is an aliphatic hydrocarbon radical, an aromatic hydrocarbon radical, or a halogen or alkyl substituted aromatic hydrocarbon radical. Illustrative of these acids are:

methanesulfonic acid
ethanesulfonic acid
dodecylsulfonic acid
benzenesulfonic acid
p-tolylsulfonic acid
dodecylbenzenesulfonic acid
2,4,6-trichlorobenzenesulfonic acid
naphthalene-$\beta$-sulfonic acid

PREPARATION OF THE COMPOUNDS

The uracil addition compounds of this invention are prepared by reacting an appropriate uracil with a suitable acid.

The uracil reactants are first prepared according to the following equations:

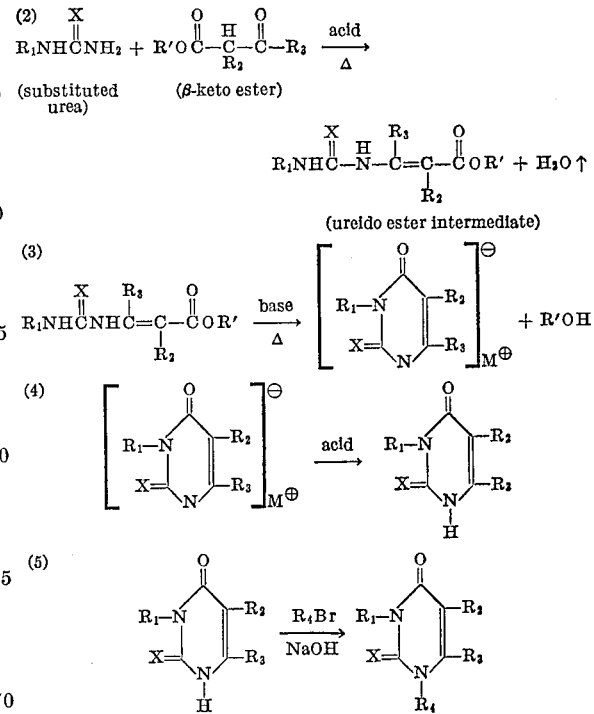

In Equations 2, 3, 4, and 5, $R_1$, $R_2$, $R_3$, $R_4$ and X have the same meaning as in Formula 1, R' is an alkyl radical of 1 through 6 carbon atoms, and $M^\oplus$ is sodium or potassium.

In preparing the uracil reactants by the method of these equations, a mixture of β-keto ester, acid, and mono-substituted urea or thiourea is stirred and distilled to remove evolved water. For maximum yields, the mixture should be stirred vigorously during heating and the water should be removed as rapidly as possible.

In order to obtain maximum theoretical conversion, the mole ratio of the β-keto ester to the mono-substituted urea or thiourea should be at least 1 to 1. Use of a slight excess of either reagent over this ratio, however, is advantageous in that it drives the reaction to completion.

The reaction is preferably run in an inert liquid medium. This inert liquid must be a substance which does not react with the reagents or products, is a liquid above 7° C., and preferably boils in the temperature range of 60° to 140° C. Suitable inert liquids are benzene, toluene, xylene, chloroform, chlorobenzene, or mixtures of these liquids with a water-miscible liquid such as dioxane. Preferably about 1 to 3 parts by weight of the inert liquid are used for each part of reactants.

The reaction is continued for from 1 to 15 hours or until water no longer evolves. The reaction time will naturally depend upon many variables, such as temperature, pressure, reactants, catalyst, and the like.

For initiation of the reaction and its successful operation, it is necessary to have an acid catalyst present. The catalyst can be a protonic acid, such as sulfuric, hydrochloric, hydrobromic, hydrofluoric, phosphoric, polyphosphoric, formic, or maleic; an acidic salt such as sodium bisulfate; or an acidic ion exchange resin. Phosphoric acid is the preferred catalyst.

The amount of acid catalyst used varies with the reactants. Generally, however, 0.01 to 1.0 mole ratio of acid catalyst to the mono-substituted urea or thiourea is sufficient.

The residue of the reaction of Equation 2 is a mixture of the desired intermediate, 3-(3-substituted ureido)-2,3-unsaturated ester, and the acid catalyst, with or without an inert liquid carrier. Although this mixture can be used without further treatment in the reaction of Equation 3, it is preferred that an essentially catalyst-free ureido intermediate be used. Such an intermediate can be obtained by washing the reaction residue with water until it is acid-free. If the reaction is carried out in an inert liquid medium, it is particularly useful to decant or siphon the hot reaction fluid away from the insoluble catalyst.

The inert liquid medium containing the ureido product can be used for the reaction of Equation 3, or if desired, relatively pure ureido compound can be obtained by distilling the inert liquid, preferably under reduced pressure.

The unsaturated ester intermediate prepared by the reaction of Equation 2 is then diluted with an inert liquid such as water, ethanol, toluene, methanol, isopropanol, acetone, tetrahydrofuran, dioxane, benzene, dimethylformamide, cyclohexanone, or mixtures of these. The mixture is heated for a short time at reflux temperature with a 1–5% excess of a strong base such as sodium alkoxide, sodium hydroxide, or potassium hydroxide. Sodium alkoxides in nonaqueous liquids are preferred as bases and media for this reaction step. Heating is continued for about 15 to 30 minutes. The reflux temperatures can vary, depending on the materials present, but usually range from 55° to 155° C. Ring closure occurs rapidly at reflux temperature.

The addition of a sufficient amount of an aqueous solution of a protonic acid to lower the pH of the reaction mixture obtained from the reaction of Equation 3 to about 1.0 neutralizes the salts of the substituted uracils and precipitates their acidic forms as solids, which can be easily filtered and dried. By protonic acid is meant an acid which dissociates to a hydrogen ion and an anion.

General descriptions for methods of preparation of uracils which are substituted in the 1-position are found in the following:

U.S. Patent 2,553,770
Journal of the American Chemical Society 52, 2006 (1930)
Journal of Organic Chemistry 14, 1099 (1949)
Journal of the American Chemical Society 54, 2436 (1932)

Other uracil starting materials can be prepared according to procedures set out in the following:

Shirley in Preparation of Organic Intermediates, 1951, p. 59
Chem. Pharm, Bull. (Tokyo) 6, 476 (1958)
Chemical Abstracts 53, 10237 (1959)
Chemical Abstracts 54, 1528 and 14279 (1960)
Japanese Patent 5574 (1959)
Arch. Biochem. Biophys. 83, 141 (1959)

To prepare the compounds of this invention, a substituted uracil reactant is mixed with an appropriate acid, at room temperature, in a liquid aromatic hydrocarbon. The reaction is immediate. Generally, any aromatic hydrocarbon can be used, but it is preferred that it be liquid between 20° C. and 30° C. and that it dissolve the reactants. Benzene, toluene, xylene, chlorobenzene, alkylated naphthalenes and other petroleum or refinery products of high aromatic content are satisfactory.

The ratio of reactants is preferably one to one. A single acid or mixtures of acids can be used.

The uracil addition compounds either precipitate from the solution at low temperature or are separated by adding a non-solvent liquid paraffin such as pentane, hexane, heptane, or petroleum ether. In either case the product precipitates as a solid or a viscous oil which can be separated by filtration or vacuum evaporation. Alternatively, the product can be separated by vacuum evaporation of the reaction medium at low temperatures, preferably below 50° C. Precipitation with a non-solvent is the usual method.

It is possible, in certain instances, to prepare the addition compound directly in an aromatic carrier oil. When this is done, it is not necessary to isolate the compound and the whole mass can be used for direct application. In such preparations, the uracil:acid ratio should be from 1:1 to 1:3.

The uracil addition compounds and formulations described herein should be prepared and stored under substantially anhydrous conditions.

UTILITY

The uracil addition compounds of this invention are excellent herbicides. They are active as general-purpose weed killers, as soil sterilants, in soil-foliage applications, and as selective weed killers for either pre- or post-emergency weed control. The compounds control both annual and perennial broadleaf weeds and grasses.

When applied as a pre-emergence treatment, these compounds control germinating broadleaf weeds such as pigweed, lamb's quarter, mustard, chickweed, and ragweed; and such grass weeds as crabgrass, watergrass, giant foxtail, and seedling Johnson grass.

In soil-foliage applications, the compounds control existing mixed annual and perennial vegetation composed of such broadleaf and grass weeds as crabgrass, foxtail, watergrass, quackgrass, bermuda grass, Johnson grass, dallis grass, vasey grass, brome grass, ragweed, cockleburr, pigweed, lamb's quarter, mare's tail, wild carrot, plantain, and goldenrod.

The broad spectrum herbicidal activity of the compounds of this invention indicates that they are highly useful in the control and eradication of undesirable vegetation on industrial sites, on railroad ballast, and in both crop and noncrop agricultural areas. In crop areas these compounds can safely be applied to weeds growing in such crops as asparagus, sugar cane, gladiolus, pineapple, and safflower.

The concentration at which the compounds of this invention are to be used as herbicides will naturally vary according to the result desired, the type of vegetation, the formulation used, the mode of application, weather conditions, foliage density, and other similar factors. Since so many variables play a role, it is not possible to indicate a concentration suitable for all situations. Generally, however, when the compounds are used in pre-emergence treatments, they are applied at concentrations of from 0.25 to 5 pounds of active ingredient per acre. Concentrations of from 0.5 to 4 pounds per acre are preferred. When the compounds are used in soil-foliage applications, they are applied at concentrations of from 5 to 35 pounds per acre.

The determination of the optimum concentration to be used in any particular application can easily be made by one skilled in the art.

HERBICIDAL COMPOSITIONS

These compounds can be formulated for use as herbicides by combining them, in herbicidally effective amounts, with adjuvants. Such adjuvants and procedures for formulating herbicidal compositions with them are disclosed in U.S. Patents 2,782,112; 2,801,911; 2,843,470; 2,849,306; and 2,895,817. By substituting the uracil addition compounds of this invention, in the proper proportions, for the active ingredients disclosed in the patents, one can formulate effective herbicidal compositions. The portions of these patents and the patents cited therein which disclose adjuvants and herbicidal formulations are hereby incorporated by reference.

The uracil addition compounds can also be formulated as granules or pellets. These can be prepared by spraying a solution of active material on the surfaces of preformed granules of such materials as vermiculite or granular attapulgite.

Pellets can be prepared by extruding, pelleting or briquetting a uracil addition compound with pelleting clay and then crushing the shaped forms. It may be desirable to add surface-active agents or binders to such formulations before extruding or pelleting.

The compounds of this invention have high oil solubility and can therefore be advantageously formulated in oils. Since the compounds are prepared in a hydrocarbon solvent, it is not necessary, in preparing oil formulations, to isolate the compounds from the reaction medium. The reaction solution can simply be mixed with an additional liquid diluent such as xylene, alkylated naphthalene or an aromatic herbicidal oil and used.

Other oils of petroleum such as fuel oil, diesel oil or kerosene can also be used. Hydrocarbons containing a substantial aromatic fraction and having boiling points of from 125° C. to 400° C. are preferred.

The herbicidal compositions are formulated so that they contain from 0.5% to 95% by weight of the uracil addition compound. The exact proportion will naturally vary with the compound, the intended use, and the degree of weed control desired.

EXAMPLES

The following examples are presented in order that this invention be more readily understood and practiced.

Example 1

At room temperature, 82 parts by weight of trichloroacetic acid are dissolved in 1000 parts by weight of reagent grade xylene. To this solution are added 124 parts by weight of 5-bromo-3-isopropyl-6-methyluracil. The resulting clear solution is allowed to stand overnight at room temperature.

The pure 5-bromo-3-isopropyl-6-methyluracil 1/1 addition compound with trichloroacetic acid is precipitated by adding the solution to 7500 parts of n-pentane. This suspension is allowed to stand for two hours at room temperature, and the addition compound is then filtered from the reaction mixture and dried. Ninety parts by weight of white crystals are obtained. These crystals have a melting point of 121–124° C.

Example 2

At room temperature, 82 parts by weight of trichloroacetic acid are dissolved in 1000 parts by weight of reagent grade xylene. Eigthy-four parts by weight of 3-isopropyl-6-methyluracil are then added to this solution.

After the solution stands at room temperature for 1 hour, crystals precipitate. These crystals of 3-isopropyl-6-methyluracil 1/1 addition compound with trichloroacetic acid are filtered from the reaction mixture, washed with n-pentane, and dried. One hundred parts of a colorless granular product with a melting point of 136–138° C. is obtained.

Uracil addition compounds can also be formed from the following reactants, using the procedure set forth in Example 2:

| Uracil Reactant | Acid |
| --- | --- |
| 5-bromo-3-isopropyl-6-methyluracil | Anhydrous hydrochloric acid. |
| Do | Anhydrous hydrobromic acid. |
| Do | Anhydrous phosphoric acid. |
| Do | Anhydrous boron trifluoride. |

Example 3

Seventeen parts by weight of trichloroacetic acid are dissolved in 100 parts by weight of xylene at room temperature. Twenty parts by weight of 3-cyclohexyl-6-methyluracil are added to this solution. A solid precipitates immediately after the uracil is dissolved. This solid product is isolated by filtering and is then washed with n-pentane. Twenty parts by weight of 3-cyclohexyl-6-methyluracil 1/1 addition compound with trichloroacetic acid are obtained, which melts at 163–165° C.

Uracil addition compounds can be similarly prepared by substituting equivalent amounts of the following uracil reactants for 3-cyclohexyl-6-methyluracil:

3-(3-methoxy)-5,6-trimethyleneuracil
5-bromo-3-(2-cyanoethyl)-6-methyluracil
5-bromo-3-(3-hydroxypropyl)-6-methyluracil
5-bromo-3-(carboethoxymethyl)-6-methyluracil
5-bromo-3-(3-pyridyl)-6-methyluracil
5-bromo-3-m-chlorophenyl-6-methyluracil
5-chloro-3-p-methoxyphenyl-6-methyluracil
5-fluoro-3-isopropyl-6-methyluracil
5-bromo-6-methyl-3-(o-tolyl) uracil
5-bromo-3-(o-fluorophenyl)-6-methyluracil
5-bromo-3-benzyl-6-methyluracil
5-chloro-3-(p-chlorobenzyl)-6-methyluracil
5-chloro-3-(p-methylbenzyl)-6-methyluracil
3-allyl-5,6-dimethyluracil
3,5-diallyl-6-methyluracil
3-cyclohexyl-1,6-dimethyl-5-iodouracil
5-bromo-6-methyl-3-propynyl uracil
5-bromo-6-methyl-3-phenyl-2-thiouracil
5-bromo-6-methyl-3-(a-naphthyl) uracil
3-(2-cyclopenten-1-yl)-6-methyluracil
6-methyl-3-(5-norbornen-2-yl) uracil
6-methyl-3-(5-norbornen-2-ylmethyl) uracil
3-(p-methylcyclohexylmethyl) uracil
3-(p-methyloxycyclohexylmethyl)-6-methyluracil
3-cyclohexyl-5-methyluracil
5-sec-butyl-3-cyclohexyl-6-methyluracil
3-cyclohexyl-5-methoxy-6-methyluracil
5-butoxy-3-cyclopropyl-6-methyluracil

Example 4

A clear solution of 82 parts by weight of trichloroacetic acid, 111 parts by weight of 3-cyclohexyl-1,6-dimethyluracil, and 1000 parts of reagent grade xylene is prepared. After standing overnight at room temperature, this solution is poured into 7000 parts of n-pentane. The resulting solution is then evaporated in vacuo over a steam bath to give a residual oil. This oil is stirred with an equal volume of n-pentane, whereupon the oil crystallizes. These crystals are filtered and dried to give 175 parts by weight of essentially pure 3-cyclohexyl-1,6-dimethyluracil 1/1 addition compound with trichloroacetic acid, having a melting point of 83–84° C.

Using procedures and proportions similar to those outlined in Examples 3 and 4, the following compounds can be reacted to give uracil addition compounds:

| Uracil Reactant | Acid Reactant |
| --- | --- |
| 3-(3a,4,5,6,7,7a-hexahydro-4,7-methanoinden-5-yl)-6-methyluracil. | α,α-Dchloropropionic acid. |
| 5-bromo-3-sec-butyl-6-methyluracil | α,α,β-Trichloropropionic acid. |
| 6-methyl-3-phenyluracil | α,α,β-Tribromopropionic acid. |
| 5,6-tetramethylene-3-cyclohexyluracil | α,α,β-Trichloropropionic acid. |
| 3-n-butyl-5-chloro-6-methyl-2-thiouracil. | α,β-Dichloroisobutyric acid. |
| 3-n-hexyl-5-hydroxymethyl-6-methyluracil. | α,α-Dichlorobutyric acid. |
| 5-bromo-3-sec-butyl-6-methyluracil | Dichloroacetic acid. |
| 5-chloro-3-isopropyl-6-methyluracil | Chloroacetic acid. |
| 3-tert-butyl-5-methyluracil | Dibromoacetic acid. |
| 3-sec-butyl-6-methyl-5-nitrouracil | Bromoacetic acid. |

*Example 5*

A solution of 124 parts by weight of 5-bromo-3-isopropyl-6-methyluracil, 168 parts of dodecylbenzenesulfonic acid (97% pure), and 250 parts of xylene is prepared. This reaction mixture is diluted with 4000 parts of n-hexane, and the solution is allowed to stand at room temperature for several days. During this time, 35 parts of unreacted uracil precipitate. This precipitate is filtered. The filtrate is diluted with 1000 parts on n-pentane and cooled in an ice bath. A precipitate of 115 parts of essentially pure 5-bromo-3-isopropyl-6-methyluracil 1/1 addition compound with dodecylbenzenesulfonic acid forms, which is filtered. It has a melting point of 45–46° C.

Uracil addition compounds can be similarly prepared by substituting equivalent amounts of the following uracil reactants for 5-bromo-3-isopropyl-6-methyluracil:

3-cyclohexyl-5-methoxymethyl-6-methyluracil
5-butoxymethyl-3-sec-6-methyluracil
3-sec-butyl-6-methyl-5-thiocyanatouracil
5-cyano-3-cyclohexyl-6-methyuracil
3-sec-butyl-5-chloromethyl-6-methyluracil
3-sec-butyl-5-fluoromethyl-6-methyluracil
3-cyclohexyl-6-methyl-5-thiolmethyluracil
3-sec-butyl-1,6-dimethyl-5-methylthiouracil
1-butyl-3-sec-butyl-6-methyl-5-phenylthiomethyluracil
5-carboxymethylthiomethyl-6-methyl-3-tert-octyluracil
5-chloro-6-chloromethyl-3-cyclohexyluracil
3-cyclohexyl-5-methylthiomethyl-6-methyluracil
5-chloro-3-isopropyl-6-methoxyuracil
5,6-dibromo-3-isopropyluracil
5-bromo-6-butoxy-3-ethyluracil Using the procedures outlined in Example 5, uracil addition compounds can also be prepared from the following reactants:

| Uracil Reactant | Acid Reactant |
| --- | --- |
| 3-sec-butyl-5-chloro-6-methyluracil | Naphthalene β-sulfonic acid. |
| 3-cyclohexyl-5,6-trimethylene uracil | Dodecylbenzene sulfonic acid. |
| 5-bromo-3-tert-butyl-6-methyluracil | Methanesulfonic acid. |
| 5-bromo-3-cyclohexyl-1,6-dimethyluracil. | p-Tolylsulfonic acid. |

*Example 6*

A mixture of 124 parts by weight of 3-isopropyl-5-bromo-6-methyluracil and 113 parts of 2,3,6-trichlorobenzoic acid is added to 1200 parts of xylene and stirred overnight at room temperature. A solid forms and is collected by filtration.

This solid is essentially pure 5-bromo-3-isopropyl-6-methyluracil 1/1 addition compound with 2,3,6-trichlorobenzoic acid.

Using the procedure of Example 6, other uracil addition compounds can be formed from the following reactants:

| Uracil Reactant | Acid Reactant |
| --- | --- |
| 5-chloro-3-sec-butyl-6-methyluracil | 2,3,5,6-tetrachlorobenzoic acid. |
| 3-cyclohexyl-6-methyluracil | 2-methoxy-3,6-dichlorobenzoic acid. |
| 5-bromo-6-methyl-3-norbornylmethyluracil. | 2-methoxy-3,5,6-trichlorobenzoic acid. |
| 5-bromo-3-cyclohexyl-6-methuluracil. | 3-amino-2,5-dichlorobenzoic acid. |
| 3-n-butyl-5-bromo-1,6-dimethyluracil. | 3-nitro-2,5-dichlorobenzoic acid. |
| 5-bromo-3-cyclohexyl-6-methyluracil | 2,3,6-trichlorophenylacetic acid. |
| 3-tert-butyl-5-chloro-6-methyluracil | 2,3,5,6-tetrachlorophenylacetic acid. |
| 3-sec-butyl-6-methyl-5-nitrouracil | 2,4-dichlorophenoxyacetic acid. |
| 3-sec-butyl-5-chloro-6-methyluracil | 2,4,5-trichlorophenoxyacetic acid. |

Although the foregoing examples show reactions using limited classes of acids, it should be understood that any acid having an ionization constant of more than $2 \times 10^{-5}$ will form addition compounds according to the procedures outlined.

*Example 7.—Oil solution*

An oil solution is prepared by mixing the following components until the solution is homogeneous:

|  | Percent |
| --- | --- |
| 5-bromo-3-isopropyl-6-methyluracil 1/1 addition compound with dodecylbenzenesulfonic acid | 40 |
| Xylene | 53 |
| Dodecylbenzene sulfonic acid | 7 |

This formulation is applied at the rate of 15 to 25 pounds of active ingredient in 60 to 100 gallons of diesel oil per acre, to railroad ballast where it is difficult to control weeds with most commercial herbicides. Fast-acting, long-lasting weed control of such annual and perennial weeds as crabgrass, mustard, Johnson grass, bermuda grass, orchard grass, bluegrass, and pigweed is obtained.

*Example 8.—Wettable powder*

The following wettable powder is prepared by blending and micropulverizing the ingredients until most particles are below 50 microns in size, and then reblending:

|  | Percent |
| --- | --- |
| 5-bromo-3(1-ethylpropyl)-6-methyluracil 1/1 addition compound with dodecylbenzene sulfonic acid | 25 |
| Partially desulfonated sodium lignin sulfonate | 1 |
| Calcined, non-swelling montmorillonoid-type clay (Pikes Peak clay) | 74 |

This composition is applied to emerged weed seedlings in sugar cane or asparagus. It is applied at 0.75 to 2.0 pounds of active ingredient per acre, dispersed in 40 gallons of water. Excellent control of pigweed, mustard, chickweed, lamb's quarter, crabgrass, watergrass, foxtail, Johnson grass seedlings, and wild oats is obtained.

The following uracil-dodecylbenzene sulfonic acid addition compounds can be similarly formulated and used:

5-bromo-3-phenyluracil
3-sec-butyl-5-chloro-6-methyluracil
5-bromo-3-cyclohexyl-6-methyluracil
3-tert-butyl-5-bromo-6-methyluracil
5-bromo-6-methyl-3-phenyluracil
5-bromo-6-ethyl-3-isopropyluracil
6-methyl-3-norbornyluracil

*Example 9.—Oil-dispersible powder*

|  | Percent |
| --- | --- |
| 5-bromo-3-isopropyl-6-methyluracil 1/1 addition compound with trichloroacetic acid | 80 |
| Blend of oil-soluble sulfonates and polyoxyethylene ethers | 3 |
| Attapulgite clay | 17 |

These ingredients are mixed, blended, and ground in a hammer mill, using care to maintain a dry mix.

This formulation is applied at a rate of 20 pounds of active ingredient per acre in 70 gallons of Lion Herbicidal Oil No. 6 for control of annual and perennial broadleaf and grass weeds growing on an industrial site. Excellent control of crabgrass, nutsedge, bromsedge, barnyard grass, Johnson grass, pigweed, goldenrod, and evening primrose is obtained.

*Example 10.—Oil solution*

| | Percent |
|---|---|
| 5-bromo-3-cyclohexyl-1,6-dimethyluracil 1/1 addition compound with α,α,β-trichloropropionic acid | 20 |
| α,α,β-Trichloropropionic acid | 3 |
| Xylene | 77 |

These ingredients are thoroughly mixed to form a homogeneous solution. This solution is diluted with 80 gallons of Lion Herbicidal Oil No. 6 and applied at 15 pounds of active ingredient per acre to give excellent control of annual morning glory, yarrow, crabgrass, quackgrass, oak and maple seedlings, wild carrot, and ragweed growing along railroad rights-of-way.

*Example 11.—Granules*

| | Percent |
|---|---|
| 5-bromo-3-sec-butyl-6-methyluracil | 40 |
| Dichloroacetic acid | 25 |
| Heavy aromatic naphtha | 35 |

These ingredients are put together and stirred to give a homogeneous solution.

Fifty pounds of this solution are sprayed on 1000 pounds of 15–30 mesh granular attapulgite and the mass is then tumbled in a blender for 10 minutes.

The resulting granules are used at the same rates and on the same weeds as described for the composition of Example 10, with equivalent results.

*Example 12.—Oil solution*

| | Percent |
|---|---|
| 5-bromo-3-sec-butyl-6-methyluracil | 40 |
| Trichloroacetic acid | 30 |
| Xylene | 30 |

These ingredients are blended until a homogeneous solution is obtained.

Fifty pounds of this composition are then added to 100 gallons of fuel oil and the resulting solution is used as described for the composition of Example 10.

I claim:

1. A method for the control of undesirable vegetation, said method comprising applying to the area to be protected from said vegetation a herbicidally effective amount of a compound of the formula

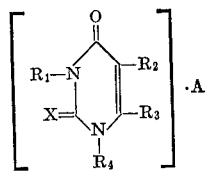

where
R$_1$ is selected from the group consisting of alkyl of 1 through 10 carbon atoms; substituted alkyl of 1 through 8 carbon atoms, wherein said substituent is selected from the group consisting of bromine, chlorine, hydroxy, alkoxy, alkoxycarbonyl, and cyano; aryl of 5 through 10 carbon atoms; substituted phenyl, wherein said substituent is selected from the group consisting of chlorine, bromine, fluorine, alkoxy, alkyl and nitro; aralkyl of 5 through 13 carbon atoms; substituted aralkyl of 5 through 13 carbon atoms, wherein said substituent is selected from the group consisting of chlorine, nitro, alkyl and alkoxy; alkenyl of 3 through 8 carbon atoms; alkynyl of 3 through 8 carbon atoms; cycloalkyl of 3 through 12 carbon atoms; cycloalkenyl of 4 through 12 carbon atoms; cycloalkyl alkyl of 4 through 13 carbon atoms; cycloalkenyl alkyl of 5 through 13 carbon atoms; (substituted cycloalkyl) alkyl of 5 through 14 carbon atoms, wherein said substituent is selected from the group consisting of bromine, chlorine, methoxy, and alkyl; (substituted cycloalkenyl)alkyl of 5 through 14 carbon atoms, wherein said substituent is selected from the group consisting of bromine, chlorine, methoxy, and alkyl; and cyano;

R$_2$ is selected from the group consisting of hydrogen, halogen, alkyl of 1 through 4 carbon atoms, alkoxy of 1 through 4 carbon atoms, nitro, alkoxymethyl of 2 through 6 carbon atoms, hydroxy alkyl of 1 through 6 carbon atoms, alkenyl of 3 through 6 carbon atoms, thiocyanato, cyano, thiolmethyl, alkylthio of 1 through 4 carbon atoms, bromomethyl, methylthiomethyl, fluoromethyl, chloromethyl, phenylthiomethyl, and carboxymethylthiomethyl;

R$_3$ is selected from the group consisting of hydrogen, chlorine, bromine, alkyl of 1 through 5 carbon atoms, chloroalkyl of 1 through 4 carbon atoms, bromoalkyl of 1 through 4 carbon atoms, and alkoxy of 1 through 5 carbon atoms; with the proviso that R$_2$ and R$_3$ can form a divalent alkylene bridge of the formula $(CH_2)_n$ where $n$ is 3, 4 and 5.

R$_4$ is selected from the group consisting of hydrogen; alkyl of 1 through 5 carbon atoms; substituted alkyl of 1 through 5 carbon atoms, wherein said substituent is selected from the group consisting of bromine, chlorine, hydroxy, alkoxy, cyano, carboxy and alkoxycarbonyl; alkenyl of 2 through 5 carbon atoms; and alkynyl of 3 through 5 carbon atoms;

X is selected from the group consisting of oxygen and sulfur; and

A is an acid having an ionization constant greater than $2 \times 10^{-5}$ selected from the group consisting of halogenated aliphatic acids containing from 2 to 5 carbon atoms, halogenated benzoic acids, halogenated phenylacetic acids, halogenated phenoxy acetic acids, organic sulfonic acids, organic phosphoric acids, and inorganic phosphoric acids.

2. A method according to claim 1 wherein the compound is 3-sec-butyl-5-chloro-6-methyluracil-2,4,5-trichlorophenoxyacetic acid.

3. A method according to claim 1 wherein the compound is 5-bromo-3-sec-butyl-6-methyluracil-trichloroacetic acid.

4. A method according to claim 1 wherein the compound is 3-cyclohexyl-5,6-trimethyleneuracil-dodecylbenzene sulfonic acid.

5. A method according to claim 1 wherein the compound is 5-bromo-3-sec-butyl-6-methyluracil-dichloroacetic acid.

6. A method according to claim 1 wherein the compound is 5-bromo-3-isopropyl-6-methyluracil-dodecylbenzene sulfonic acid.

7. A method according to claim 1 wherein the compound is 5-bromo-3-tert-butyl-6-methyluracil-dodecylbenzene sulfonic acid.

References Cited

UNITED STATES PATENTS

| 2,688,020 | 8/1954 | Mackay et al. | 260—260 |
| 2,959,475 | 11/1960 | Luckenbaugh | 71—2.5 |
| 2,969,364 | 1/1961 | Lyttle | 71—2.5 X |
| 3,002,975 | 10/1961 | Slezak | 260—260 |
| 3,018,175 | 1/1962 | Cameron | 71—2.5 |
| 3,235,357 | 2/1966 | Loux | 71—2.5 |
| 3,235,360 | 2/1966 | Soboczenski | 71—2.5 |

LEWIS GOTTS, *Primary Examiner.*

JAMES O. THOMAS, JR., *Examiner.*